(12) United States Patent
Robertson et al.

(10) Patent No.: US 6,938,791 B2
(45) Date of Patent: Sep. 6, 2005

(54) COLD BOX LID

(75) Inventors: James David Robertson, Atlanta, GA (US); Bernard Primiano, Marietta, GA (US); Ming Sun, Roswell, GA (US)

(73) Assignee: Display Industries, LLC., Norcross, GA (US)

( * ) Notice: Subject to any disclaimer, the term of this patent is extended or adjusted under 35 U.S.C. 154(b) by 63 days.

(21) Appl. No.: 10/690,939

(22) Filed: Oct. 22, 2003

(65) Prior Publication Data

US 2005/0087533 A1 Apr. 28, 2005

(51) Int. Cl.$^7$ .............................................. B65D 51/18
(52) U.S. Cl. ................... 220/254.3; 220/259.1; 206/776
(58) Field of Search .................. 220/254.3, 254.4, 220/254.6, 254.9, 592.02, 592.16, 259.1–259.5, 810, 814, 816, 836, 843, 915.1, 915.2, 908; D7/601–605; 62/3.62; 206/776–778

(56) References Cited

U.S. PATENT DOCUMENTS

| | | | | |
|---|---|---|---|---|
| 3,417,897 A | * | 12/1968 | Johnson | 220/254.3 |
| 4,143,695 A | * | 3/1979 | Hoehn | 220/826 |
| 4,449,761 A | * | 5/1984 | Davis et al. | 312/116 |
| D305,490 S | * | 1/1990 | Conley et al. | D7/605 |
| 5,064,088 A | * | 11/1991 | Steffes | 220/837 |
| 6,026,647 A | * | 2/2000 | Coffee et al. | 62/3.62 |
| D452,418 S | * | 12/2001 | Moffett et al. | D7/605 |
| 6,523,713 B1 | * | 2/2003 | Helms | 220/813 |

FOREIGN PATENT DOCUMENTS

JP    2000-139314 A  *  5/2000  ................. 62/3.62

* cited by examiner

*Primary Examiner*—Lien M. Ngo
(74) *Attorney, Agent, or Firm*—John L. James

(57) ABSTRACT

A lid for a cold box has a shell-like configuration with front and rear shell members hingedly connected. The front shell member pivots relative to the rear shell member to provide access to the interior of the cold box when the front shell member is lifted by a handle. A viewing window is provided in the front shell member. The rear shell member is vented to provide passageways for the intake and outtake of air.

7 Claims, 4 Drawing Sheets

COLD BOX LID

TECHNICAL FIELD OF THE INVENTION

This invention relates generally to a cooler for cooling beverages, medicine and other items, and more particularly relates to a lid for a cold box.

BACKGROUND OF THE INVENTION

With the advent of miniature cooling devices, such as a Peltier cooler for example, it is possible to provide a small electric cooler for use in places such as an automobile. Such a cooler could be positioned in the console that divides the front seats of an automobile and operated from the automobile power supply or a separate battery. In some situations, it may be convenient to simply provide a box to house the cooler. It is desirable to have a lid for the box that provides easy access to the contents of the box. It is also desirable to view the contents of the box without opening the lid.

A miniature cooling device provides the opportunity to provide a small electric cooler for use in places such as supermarkets and convenience stores. In such retail outlets floor space is typically at a premium and an electrical outlet is not conveniently located for an electric cooler requiring the use of ice. It is desirable to have a cooler that could operate without an electrical outlet and that does not require the use of ice. It is desirable to have a lid for a cooler that provides easy access to the contents of the cooler. It is also desirable to view the contents of the cooler without opening the lid.

SUMMARY OF THE INVENTION

The present invention is directed to overcoming one or more of the problems set forth above. Briefly summarized, according to one aspect of the present the invention, an apparatus comprises front and rear shell members connected by a hinge. The front shell member has a top portion with a rear edge portion, a left side portion attached to the top portion, a right side portion attached to the top portion, and a front portion attached to the top, left and right side portions. The rear shell member has a top portion with a front edge portion, a left side portion attached to the top portion, a right side portion attached to the top portion, and a rear portion attached to the top, left and right side portions. The hinge connects the front and rear shell members along the rear edge portion of the front shell member and the front edge portion of the rear shell member. The front shell member is movable between a closed position at which the front and rear shell members abut one another and an open position at which the left and right side portions of the front shell member are spaced from the left and right side portions of the rear shell members. The left and right side portions of the front shell member are tapered so that the top portion of the front shell member slants downward from rear to front.

A handhold attached to the front shell member allows the front of the front shell member to be lifted causing it to pivot relative to the rear shell member because of the hinged connection. The handhold is attached to the top portion of the front shell member and the front portion of the front shell member.

A front rib extends along a bottom edge of the front shell member and a rear rib extends along a bottom edge of rear shell member. The rear rib has a larger height and width than the front rib. The front rib is a reinforcing rib, and also provides a wider surface for resting on or attaching to the cold box. The rear rib is also a reinforcing rib, and provides a surface for attaching to the outside of the cold box.

The rear shell member has an air vent including at least one opening formed in one of the left and right portions and preferably extending into the top portion of the rear shell member.

According to another aspect of the invention, the front shell member of a lid for a cold box is transparent while the rear shell member is opaque. A transparent member allows the contents of the cold box to be viewed without opening the lid. An opaque shell member allows the cooler to be hidden from view.

These and other aspects, objects, features and advantages of the present invention will be more clearly understood and appreciated from a review of the following detailed description of the preferred embodiments and appended claims, and by reference to the accompanying drawings

DETAILED DESCRIPTION OF THE PREFERRED EMBODIMENTS

Figure 1:
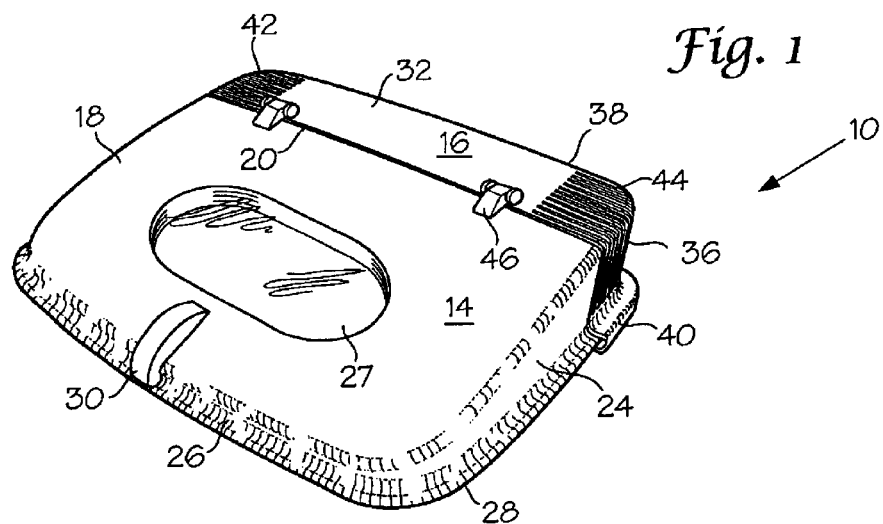
FIG. 1 is a perspective front view of a preferred embodiment of a lid for a cold box according to the present invention.
Figure 2:
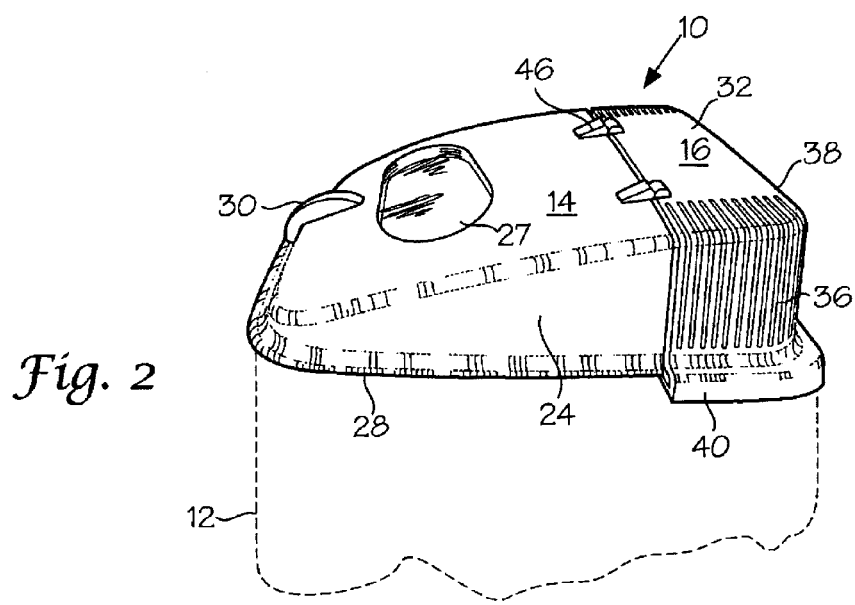
FIG. 2 is a perspective right side view of the lid to FIG. 1 shown mounted on a cold box.
Figure 3A:
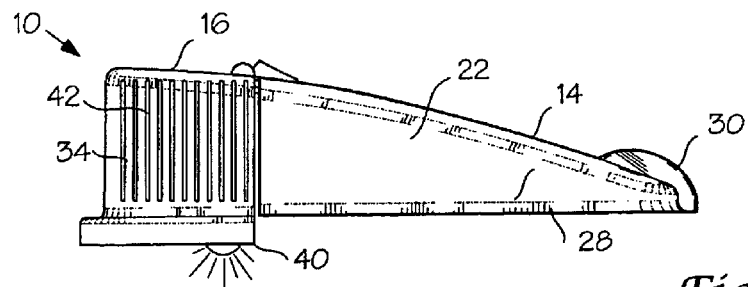
FIGS. 3A–3B is are left and right side views of the lid of FIG. 1.
Figure 3B:
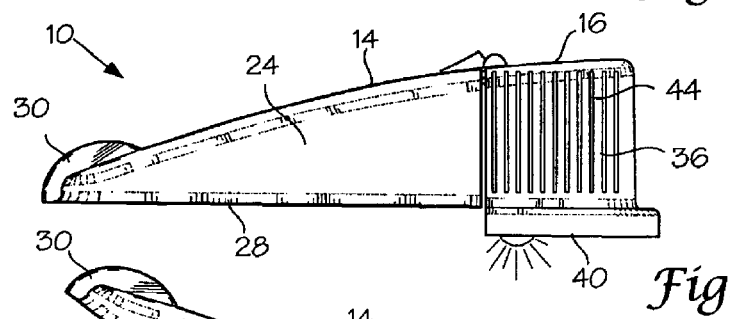
Figure 4:
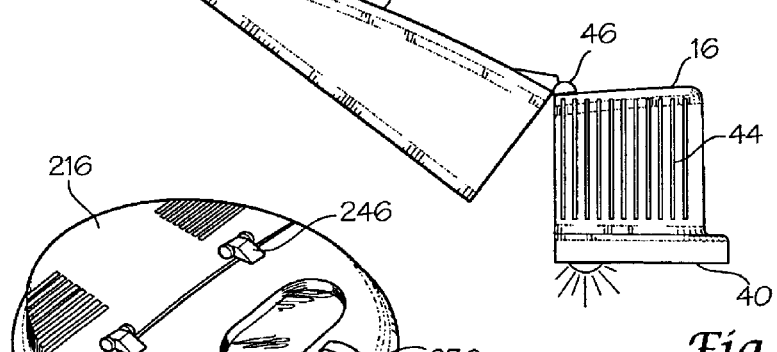
FIG. 4 is a right side view of the lid with the lid in the open position.

Referring to FIGS. 1–4, a lid 10 for a cold box 12 has a clam shell configuration with front and rear shell members 14, 16. The Front shell member 14 has a top portion 18 with a rear edge portion 20, a left side portion 22 attached to top portion 18, a right side portion 24 attached to top portion 18, and a front portion 26 also attached to the top, left and right side portions 18, 22, 24. The left, right and front side portions 22, 24, 26 extend downward from top portion 18 forming a boundary and defining a portion of a shell interior. The front shell member 14 is preferably opaque with a transparent viewing window 27 so that items in the cold box 12 may be viewed without actually opening the lid to the cold box. Alternatively, front shell member 14 may be transparent in its entirety. To reinforce front shell member 14, a front rib 28 extending along the bottom edge of front shell member 14 may be used. Using a reinforcing rib allows thinner material to be used saving material overall.

Each of the left and right side portions 22, 24 of the front shell member 14 has top, bottom, front and rear edge portions, with the rear edge portion being greater in height than the front edge portion. The left and right side portions of the front shell member are tapered so that the top portion 18 of the front shell member slants downward from rear to front. The slanting top portion 18 increases the aesthetic appeal of the lid. To decrease heat infiltration, the top portion, and the side and front portions of the front member may be double walled to create an insulating air space.

A handhold 30 can be attached to the front shell member 14 to facilitate opening and closing. The handhold is preferably attached to the top and front side portions 18, 26 of front shell member 14. Having the handhold protrude from both the top and front allows the lid to be opened and closed from the front or from above.

The rear shell member 16 has a top portion 32 with a front edge portion. A left side portion 34 is attached to top portion 32, a right side portion 36 is attached to top portion 32, and a rear portion 38 is attached to the top, left and right side portions 32, 34, 36. Rear shell member 16 is preferably opaque to obscure the cooling element.

Rear shell member 16 has a rear rib 40 extending along its bottom edge. Preferably, rear rib 40 has larger height and width dimensions than front rib 28.

The rear shell member 16 has at least one, and preferably two air vents 42, 44. One vent serves as an air inlet and the other serves as an air exhaust. Each vent includes at least one opening, and preferably a plurality of openings, formed in the left and right side portions of the rear shell member. The vents are preferably located at the corner to extend into the left, right and rear side panels 34, 36, 38, and top portion 32 as well to ensure the vent is open regardless of the position of the cold box.

A hinge 46 connects the front and rear shell members 14, 16 so that front shell member 14 pivots vertically relative to rear shell member 16. Hinge 46 may be an actual hinge or pair of hinges fastened to front and rear shell members 14, 16, or may be a plastic hinge formed of a thinner section of material than shell members 14, 16. Hinge 46 connects front and rear shell members along rear edge portion 20 of front shell member 14 and the front edge portion of the rear shell member 16. Front shell member 14 is movable between a closed position at which the front and rear shell members abut one another and an open position at which the left and right side portions of the front shell member are spaced from the left and right side portions of the rear shell member.

Figure 5:
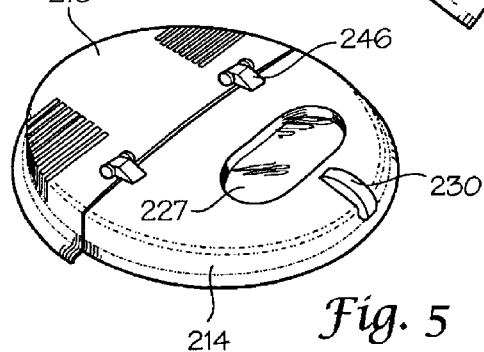
FIG. 5 is perspective top view of a lid similar to FIG. 1 but illustrating another preferred embodiment.
Figure 6:
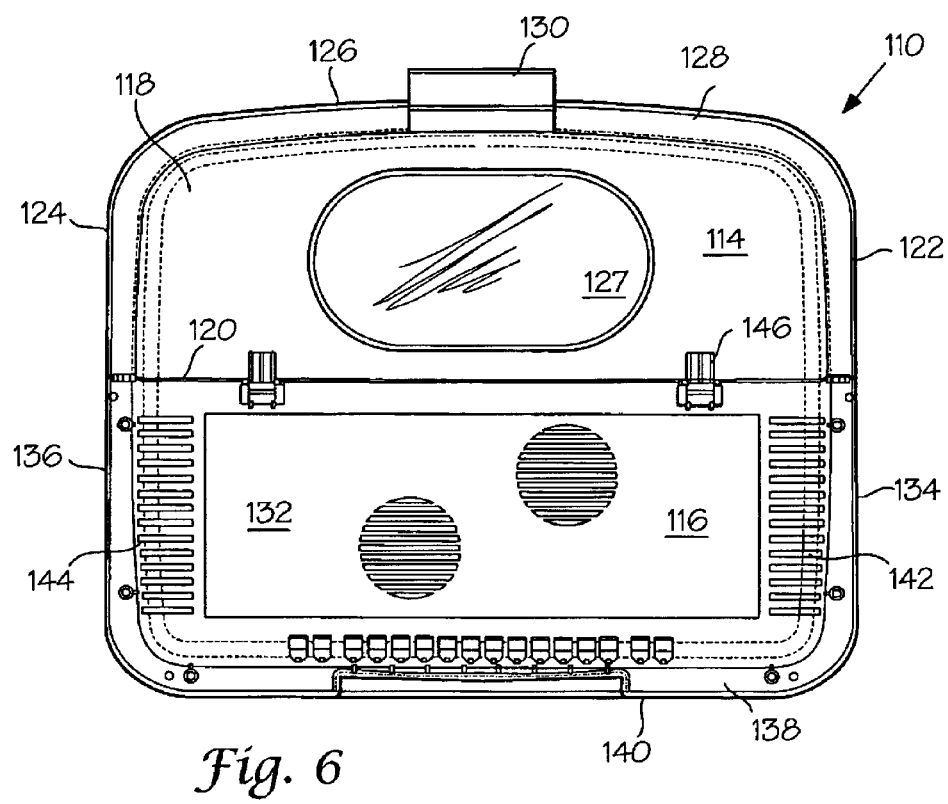
FIG. 6 is a top view of another preferred embodiment of a lid for a cold box according to the present invention.
Figure 7:
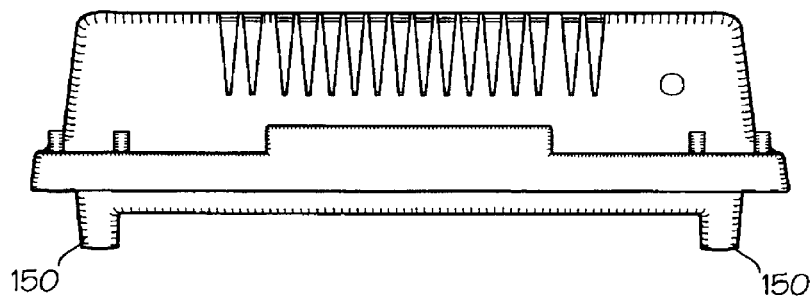
FIG. 7 is a rear view of the lid of FIG. 6.
Figure 8:
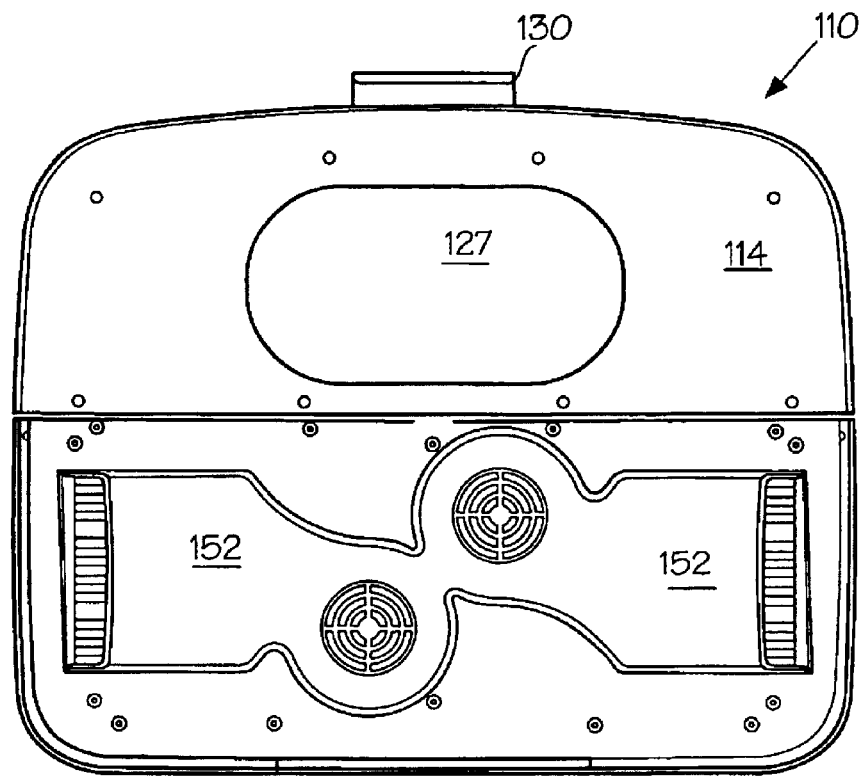
FIG. 8 is inside view of the lid of FIG. 6 showing air circulation fans.
Figure 9:
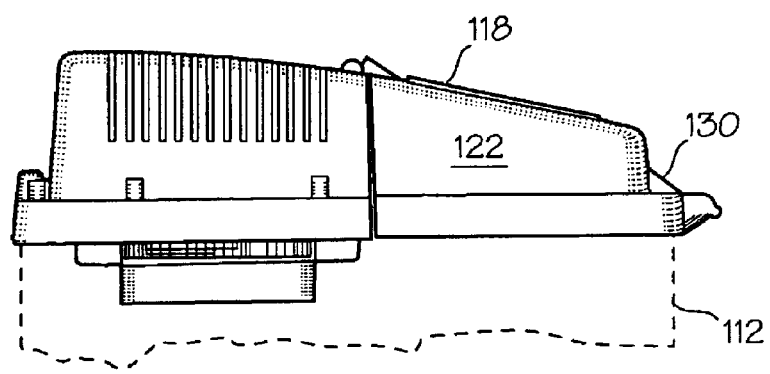
FIG. 9 is a left side view of the lid of FIG. 6.

Referring to FIG. 5, lid 210 for a cold box has a circular clam shell configuration for fitting a FROSTY PAUSE cooler, manufactured by the assignee of the present invention, or similar cooler. Lid 210 has front and rear shell members 14, 16 connected by hinge 246. It has a transparent viewing window 227 and front handhold 230. It is similar to lid 10 of FIGS. 1–4 except that it is circular.

Referring to FIGS. 6–9, a lid 110 for a cold box 112 has a clam shell configuration with front and rear shell members 114, 116. The Front shell member 114 has a top portion 118 with a rear edge portion 120, a left side portion 122 is attached to top portion 118, a right side portion 124 is attached to top portion 118, and a front portion 126 is also attached to the top, left and right side portions 118, 122, 124. The left, right and front side portions 122, 124, 126 extend downward from top portion 118 forming a boundary and defining a portion of a shell interior. The Front shell member 114 is preferably opaque with a transparent viewing window 127 transparent so that items in the cold box 112 may be viewed without actually opening the lid to the cold box. Alternatively, front shell member 114 may be transparent in its entirety.

To reinforce front shell member 114, a front rib 128 extending along the bottom edge of front shell member 114 may be used. Using a reinforcing rib allows thinner material to be used thereby saving material and reducing cost.

Each of the left and right side portions 122, 124 of the front shell member 114 has top, bottom, front and rear edge portions, with the rear edge portion being greater in height than the front edge portion. The left and right side portions of the front shell member are tapered so that the top portion of the front shell member slants downward from rear to front. The slanting top portion 118 increases the aesthetic appeal of the lid. To decrease heat infiltration, the top portion, and the side and front portions of the front member may be double walled to create an insulating air space.

A handhold 130 can be attached to the front shell member 114 to facilitate opening and closing. The handhold is preferably attached to the top and front side portions 118, 126 of front shell member 114. Having the handhold protrude from both the top and front allows the lid to be opened and closed from the front or from above.

The rear shell member 116 has a top portion 132 with a front edge portion. A left side portion 134 is attached to top portion 132, a right side portion 136 is attached to top portion 132, and a rear portion 138 is attached to top, left and right side portions 132, 134, 136. Rear shell member 116 is preferably opaque to obscure the cooling element. The cooling element including fans 152 can be mounted on the inside of the rear portion of the lid.

Rear shell member 116 has a rear rib 140 extending along its bottom edge. Preferably, rear rib 140 has the same height and width dimensions as front rib 128.

The rear shell member 116 has at least one, and preferably two air vents 142, 144. One vent serves as an air inlet and the other serves as an air exhaust. Each vent includes at least one opening, and preferably a plurality of openings, formed in the left and right side portions of the rear shell member and in the top portion.

A pair of hinges 146 connect the front and rear shell members 114, 116 so that front shell member 114 pivots vertically relative to rear shell member 116. Hinges 146 connect front and rear shell members along rear edge portion 120 of front shell member 114 and the front edge portion of the rear shell member 116. Front shell member 114 is movable between a closed position at which the front and rear shell members abut one another and an open position at which the left and right side portions of the front shell member are spaced from the left and right side portions of the rear shell member.

The lid may have a pair of legs 150 to help anchor it. In the case of a FROSTY PAUSE cooler or similar cooler, the legs may fit inside the cooler.

It can now be appreciated that a clam shell type lid for a cold box has been presented. The lid has a transparent product viewing window in the front shell member and an opaque rear shell member. The front shell member has a top portion with a rear edge portion along the rear thereof. A left side portion is attached to the top portion, a right side portion is attached to the top portion, and a front portion is attached to the top, left and right side portions. The left and right side portions are tapered to cause the front shell member to slant downward from rear to front.

The opaque rear shell member has an air inlet and an air outlet, and a top portion with a front edge portion. A left side portion is attached to the top portion, a right side portion is attached to the top portion, and a rear portion is attached to the top, left right side portions. The front and rear shell members are hingedly connected along the rear edge portion of the front shell member and the front edge portion of the rear shell member.

A front reinforcing rib extends along a bottom edge of the front shell member and a rear rib extends along a bottom edge of rear shell member. A handhold is attached to the front shell member for ease of opening and closing the lid.

Operation of the lid is believed to be apparent from the foregoing description, but a few words will be added for emphasis. The lid may be used without fasteners, particularly in instances where the cooling elements are attached to the rear shell member or where the lid has mass sufficient to hold it in position on the box or cooler. In such cases, the mass alone is sufficient to stabilize the lid. In other instances, and more preferably, the lid is secured to the cold box by an adhesive, in the form of a peel-off adhesive strip, or with double sided adhesive tape or screws. The tape or adhesive is applied to the rear shell member along its bottom opposite the rear lip. When so secured, the front shell member lies flush on the cold box or cooler.

While the invention has been described with particular reference to the preferred embodiments, it will be understood by those skilled in the art that various changes may be made and equivalents may be substituted for elements of the preferred embodiments without departing from invention. It is therefore contemplated that other modifications and applications will occur to those skilled in the art. It is accordingly intended that the claims shall cover all such modifications and applications as do not depart from the true spirit and scope of the invention.

What is claimed is:

1. An apparatus, comprising:

a front shell member having a top portion with a rear edge portion, a left side portion attached to said top portion, a right side portion attached to said top portion, and a front portion attached to said top portion, left side portion and right side portion, each of said left and right side portions of said front shell member has top, bottom, front and rear edge portions, said rear edge portion being greater in height than said front edge portion, said left and right side portions of said front shell member being tapered so that said top portion of said front shell member slants downward from rear to front;

a transparent viewing window in said front shell member;

an opaque rear shell member having a top portion with a front edge portion, a left side portion attached to said top portion, a right side portion attached to said top portion, and a rear portion attached to said top portion, left side portion and right side portion;

an air inlet and an air outlet in said rear shell member; and a hinge connecting said front and rear shell members along said rear edge portion of said front shell member and said front edge portion of said rear shell member, said front shell member being movable between a closed position at which said front and rear shell members abut one another and an open position at which said left and right side portions of said front shell member are spaced from said left and right side portions of said rear shell members.

2. An apparatus, as set forth in claim 1, including a handhold attached to said front shell member.

3. An apparatus, as set forth in claim 2, wherein said handhold is attached to said top portion of said front shell member and said front portion of said front shell member.

4. An apparatus, as set forth in claim 1, including a front rib extending along a bottom edge of said front shell member.

5. An apparatus, as set forth in claim 1, including a rear rib extending along a bottom edge of said rear shell member.

6. An apparatus, as set forth in claim 1, including a front rib extending along a bottom edge of said front shell member and a rear rib extending along a bottom edge of rear shell member, said rear rib having a larger height and width than said front rib.

7. A lid for a cold box, comprising:

a transparent front shell member having a top portion with a rear edge portion, a left side portion attached to said top portion, a right side portion attached to said top portion, and a front portion attached to said top portion, left side portion and right side portion, said left and right side portions being tapered so that said front shell member slants downward from rear to front;

an opaque rear shell member having an air inlet and an air outlet, a top portion with a front edge portion, a left side portion attached to said top portion, a right side portion attached to said top portion, and a rear portion attached to said top portion, left side portion and right side portion, said front and rear shell members being hingedly connected along said rear edge portion of said front shell member and said front edge portion of said rear shell member;

a front reinforcing rib extending along a bottom edge of said front shell member and a rear reinforcing rib extending along a bottom edge of rear shell member; and a handhold attached to said front shell member.

* * * * *